United States Patent [19]

Taylor

[11] Patent Number: 5,076,213
[45] Date of Patent: Dec. 31, 1991

[54] ROOSTER SHELTER AND EXERCISING APPARATUS

[76] Inventor: Charles D. Taylor, Rte. 1, Box 920, Turtletown, Tenn. 37391

[21] Appl. No.: 705,943

[22] Filed: May 28, 1991

Related U.S. Application Data

[63] Continuation-in-part of Ser. No. 623,765, Dec. 7, 1990, abandoned.

[51] Int. Cl.$^5$ ............................................. A01K 23/00
[52] U.S. Cl. ..................................................... 119/23
[58] Field of Search .................. 119/23, 57.8, 70, 109, 119/111

[56] References Cited

U.S. PATENT DOCUMENTS

| | | | |
|---|---|---|---|
| 3,086,499 | 4/1963 | Dilley | 119/23 |
| 3,211,130 | 10/1965 | Prince | 119/23 |
| 3,645,235 | 2/1972 | Suchla | 119/57.8 X |
| 4,765,277 | 8/1988 | Bailey et al. | 119/23 X |
| 5,003,929 | 4/1991 | Dean | 119/109 X |

Primary Examiner—Gene Mancene
Assistant Examiner—Thomas Price
Attorney, Agent, or Firm—Alan Ruderman

[57] ABSTRACT

Protective sheltering apparatus for a rooster includes a housing mounted above the ground on the upper end of a vertically disposed pole and leashing apparatus for permitting the rooster to move limited distances about the pole and to fly up into the housing. The configuration of the housing is a pyramid or similar shape having side walls that come to a point. The leashing apparatus includes a sleeve positioned about the lower end of the pole, a leash having one end connected to the leg of the rooster and the other end connected to a ring positioned about the pole. The inner diameter of the ring is larger than the outer diameter of the sleeve so that not only can the rooster fly up with the ring constrained by the pole, but when the rooster is on the ground the ring may freely move relative to the sleeve. Thus, the leash becomes wrapped about the sleeve due to the rooster's movements, further pulling on the leash will result in the sleeve rotating relative to the pole to release the leash and not injure the rooster.

7 Claims, 1 Drawing Sheet

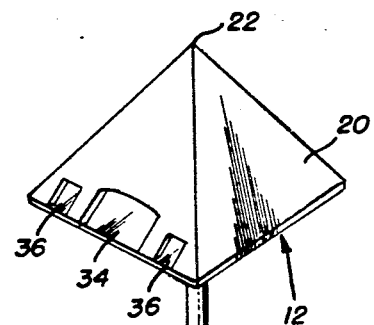
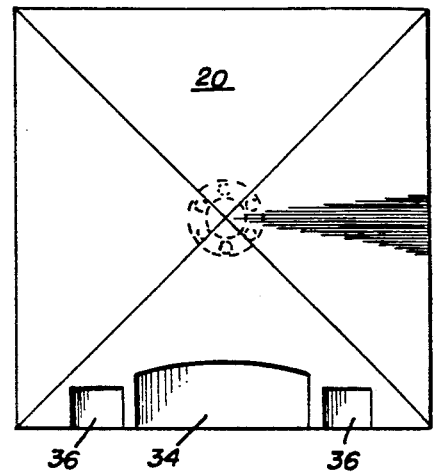
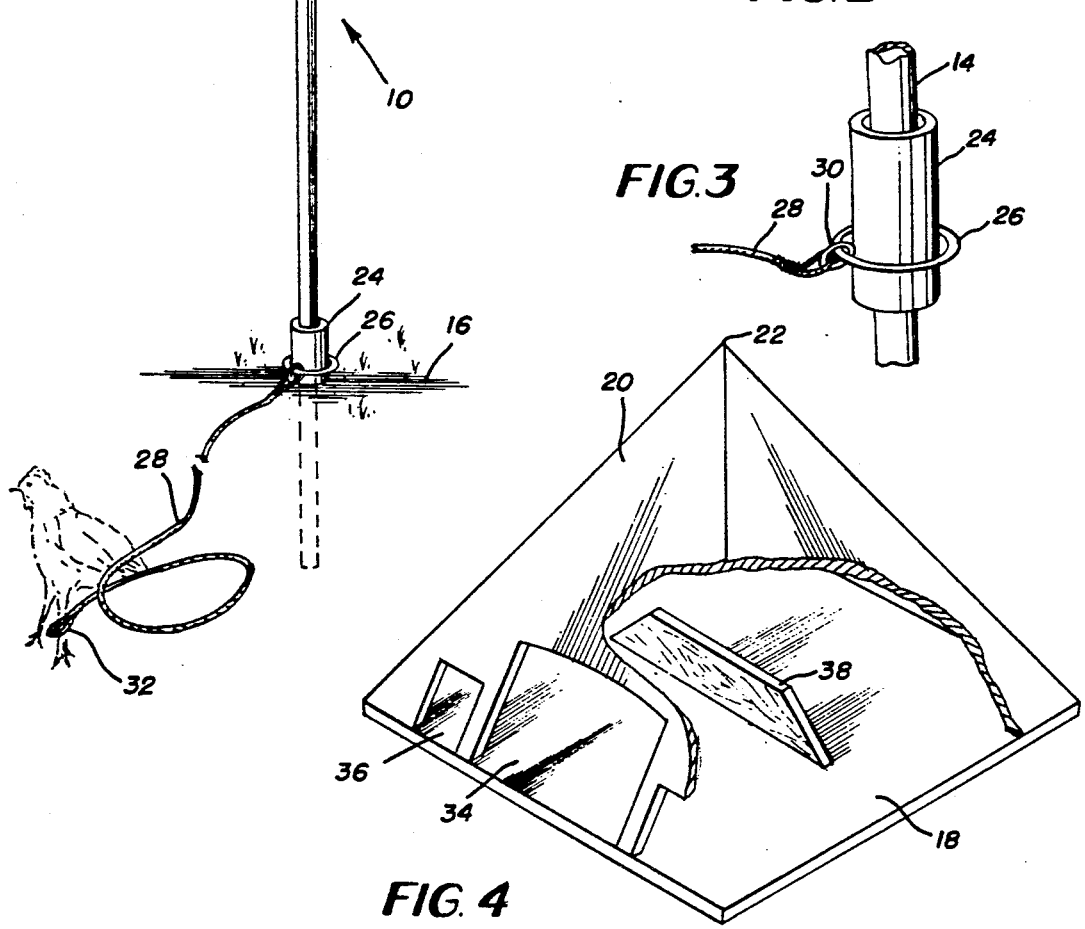

ROOSTER SHELTER AND EXERCISING APPARATUS

REFERENCE TO RELATED APPLICATIONS

This application is a continuation-in-part of application serial No. 07/623,765 filed Dec. 7, 1990, now abandoned.

BACKGROUND OF THE INVENTION

This invention relates to a shelter and exercising apparatus for game birds such as roosters, and more particularly to a shelter mounted on the upper end of a pole and means for securing the rooster to the pole while permitting the rooster to fly up to the shelter safely and to move limited distances about the pole.

Game roosters are not wild birds but may be extremely valuable and relatively expensive fowl. When roosters sleep at or near ground level they are prone to being attacked by other animals such as wild dogs, cats, raccoons, etc., and many a valuable rooster has been destroyed in evening attacks by such animals. For a rooster to be effective it cannot be locked up but must remain free to exercise and perform its functions. Because of this rooster owners in the prior art have risked rooster losses due to animal attacks and inclement weather conditions, and many owners have regretted taking such risk.

SUMMARY OF THE INVENTION

Consequently, it is a primary object of the present invention to provide a rooster shelter mounted on a pole above the ground, the shelter and pole having means for permitting a rooster to be constrained to move limited distances about the pole and to fly into, onto or over the shelter without physical harm.

It is another object of the present invention to provide protective sheltering apparatus for a rooster so as to avoid attack by non-flying animals, the apparatus including a shelter disposed on a pole above ground level, leashing means including a leash for restraining the rooster to the pole yet permitting the rooster to move about the pole and to fly up to the shelter, the leashing means having elements trapped about the pole and precluding the leash from wrapping tightly about the pole and itself, and the shelter having a configuration for preventing the leash from being captured thereon.

Accordingly, the present invention provides a rooster shelter mounted above the ground on the upper end of a vertically disposed pole and leashing apparatus for permitting a rooster to move limited distances about the pole and to fly up into the shelter. The leashing apparatus includes a sleeve loosely disposed about the lower end of the pole, a leash having one end attachable to the leg of a rooster and the other end connected to a ring disposed about the pole. The inner diameter of the ring is larger than the outer diameter of the sleeve and is slidable and rotatable relative to the sleeve thereby to prevent the leash from being tightly wrapped about and locked to the pole. The shelter comprises a housing having an upper end that terminates at a point so that the leash will not become hung up on the top of the shelter when the rooster flies over the top.

The mounting of the shelter on the top of the pole above the ground provides the rooster with protection from animals which otherwise may attempt to physically attack the rooster. Additionally, the shelter provides a location for a roost and for food. Thus, the rooster must fly up into the shelter to obtain such food and to roost, and fly back to the ground as desired. This provides the rooster with necessary exercise. The arrangement for preventing the leash to be entangled or tightly wrapped about the pole not only ensures that the rooster has freedom of movement but also precludes injury to its leg, and the configuration of the top of the shelter not only prevents the leash from being caught on the top of the shelter as the rooster flies over it, but also prevents rain and snow from accumulating on the roof.

BRIEF DESCRIPTION OF THE DRAWINGS

The particular features and advantages of the invention as well as other objects will become apparent from the following description taken in connection with the accompanying drawings in which:

FIG. 1 is a perspective view of a rooster shelter and exercise apparatus constructed in accordance with the principles of the present invention;

FIG. 2 is a top plan view of the shelter illustrated in FIG. 1;

FIG. 3 is an enlarged perspective view of the leash restraining apparatus illustrated in FIG. 1; and FIG. 4 is an enlarged perspective view of the shelter of FIG. 1 partly broken away to illustrate the roost in the interior thereof.

DESCRIPTION OF THE PREFERRED EMBODIMENT

Referring now to the drawings protective sheltering apparatus 10 constructed in accordance with the present invention is illustrated in FIG. 1. The apparatus includes a shelter 12 securely mounted on the top of a vertical pole 14 which is securely staked in the ground 16. The shelter 12 comprises a housing including a floor 18 to the underside of which the pole 14 is secured by conventional means, and wall means 20 extending upwardly from the floor and terminating at a point 22 centrally disposed above the floor and forming the top of the shelter. In the preferred embodiment of the invention the configuration is substantially that of a pyramid so that the floor is of a square configuration and the wall means 20 comprises four triangle shape inclined walls which intersect at the point 22. The shelter, however, may comprise other configurations having a floor extending by wall means to a point such as other flat wall configurations having more or less than four walls or non-flat walls such as a conical configuration. The preferred embodiment is formed from plywood and thus the pyramid configuration may be readily constructed whereas a conical configuration or the like is difficult to construct from wood but may be a more economical form if the shelter were constructed from plastic or the like by molding. In any event, the cross sectional configuration of the floor 18 will be determined by the configuration of the wall means 20. The significance of the pointed top 22 of the wall means 20 will hereinafter be described, but it may here be noted that its purpose is to preclude a rooster attached leash from being caught or trapped on the top of the shelter which could result in injury to the rooster.

The pole 14 may be of any convenient material and may be conventional pipe such as one inch outside diameter galvanized water pipe. A simple pipe flange readily attached by threading to the pipe may then be utilized for attaching the pipe to the underside of the floor 18 of the shelter.

Disposed about the bottom end of the pipe is a cylindrical sleeve 24, the sleeve having an inside diameter which is larger than the outside diameter of the pole 14, the length of the sleeve 24 being only a small fraction of the length of the pole 14. For example, with the length of the pole 14 in the order of approximately ten feet, the sleeve 24 may be in the order of approximately three and one half inches. Because the sleeve 14 has a larger inside diameter than the outer diameter of the pole, the sleeve is movable both axially and circumferentially relative to the pole 14. Disposed about the sleeve 24 is a ring 26 having an inner diameter which is larger than the outer diameter of the sleeve 24 so as to be freely movable relative thereto. Preferably both the sleeve 24 and the ring 26 are constructed from PVC and may be small longitudinal sections cut from PVC pipe of different diameters. A leash 28, which may be rope or the like, may be tied about the ring 26 or preferably tied to a connecting member 30 which in turn is securely looped about the ring 26. The other end of the leash 28 is connected to a band or bracelet 32 which is latched about one of the legs of the rooster.

The wall means 20 of the shelter 12 preferably has a passageway 34 therein for ingress and egress of the rooster, and a pair of openings 36 for disposing food and water troughs therein. Additionally, the floor 18 of the shelter may have a fence 38 upstanding therefrom and forming a roost upon which the rooster may park and sleep.

It will be understood that the rooster is tied to the pole 14 by means of the leash 28 and the connecting ring 26. The rooster may move about the pole as restrained by the leash 28 and may fly up to the shelter when desired. In the evening, the rooster may park in the shelter on the roost and be out of attack area from ground based animals. As the rooster flies up toward the shelter the ring 26 moves axially up the pole 14.

If the rooster moves rapidly in a circular motion about the pole while on the ground, the leash 28 will tend to wind about the sleeve 24 and if the winding is tight and the rooster pulls, the leash as it is pulled will apply a tangential force at the surface of the sleeve 24 spaced from the pole 14. This causes the sleeve to rotate about the pole. As the sleeve rotates the leash unwinds as the rooster continues to pull in the direction away from the pole, the ring 26 rotating about the sleeve and thus rotating relative to the pole 14. The action of the leash 28 about the sleeve 24 is similar to that of a capstan, the pulling of the leash resulting in the sleeve rotating to permit the leash to unwind rapidly to thereby prevent injury to the rooster. Without the sleeve, the leash would become tightly wound about the pole and if the rooster tried to pull on the leash it could be injured. If the rooster decides to fly up above the shelter such as from one side to another, the leash when it engages the shelter will slide along the inclined walls so that it does not get caught on a surface thereof and as the rooster continues in its path over the shelter the point 22 precludes the leash from becoming caught on the top of the shelter. Thus, the leash will merely slip off the top and down the inclined wall means thereby precluding the leash from getting caught on the shelter and hanging downwardly with the rooster tied thereto. Accordingly, the inclined wall means and the point at the top of the shelter together with the connection of the leash about the pole prevent injury from occurring to the rooster as it prances, walks and flies relative to the pole and the shelter. The configuration of the wall means and pointed top of the shelter also precludes rain and snow from accumulating on the top of the shelter.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Protective sheltering apparatus for a rooster comprising a shelter housing including a floor, wall means extending from peripheral portions of said floor at an upward inclination and terminating at a single point spaced above said floor, a vertically disposed pole having a lower end and an upper end, means for fixing said lower end at ground level and means for mounting the underside of said floor on said upper end, leashing apparatus including a cylindrical sleeve loosely disposed about the lower end of said pole, a leash having one end attachable to a leg of a rooster and a second end, a ring disposed about said pole, and means for connecting said second end of said leash to said ring, said ring having an inner diameter larger than the outer diameter of said sleeve and adapted to be disposed about said sleeve so that said ring may be pulled upwardly along said pole by said leash and may drop downwardly around said sleeve.

2. Apparatus as recited in claim 1, wherein said wall means comprises four walls, each wall having a triangular configuration such that said housing comprises a pyramid.

3. Apparatus as recited in claim 1, wherein the length of said sleeve is small relative to the length of said pole.

4. Apparatus as recited in claim 1, wherein said sleeve may be rotated relative to said pole when a tangential force is applied to said sleeve.

5. Apparatus as recited in claim 4, wherein the length of said sleeve is small relative to the length of said pole.

6. Apparatus as recited in claim 4, wherein said wall means comprises four walls, each wall having a triangular configuration such that said housing comprises a pyramid.

7. A method of protecting a rooster from attack by animals on the ground comprising positioning a pole through a cylindrical sleeve, fastening said pole in a vertical disposition, providing a housing having walls which intersect at a point, attaching said housing at the upper end of said pole, with said point disposed upwardly, connecting one end of a leash about a leg of said rooster, providing a ring about said pole and about said sleeve, and connecting the other end of said leash to said ring.

* * * * *